(12) United States Patent
Blanton et al.

(10) Patent No.: US 9,514,664 B2
(45) Date of Patent: Dec. 6, 2016

(54) MEASURING LATENCY IN A TEST SYSTEM USING CAPTURED IMAGES

(71) Applicant: The Boeing Company, Chicago, IL (US)

(72) Inventors: William Brendan Blanton, Wilmington, DE (US); Robert Crenshaw Allen, Voorhees, NJ (US); Thomas Alfred DuBois, Media, PA (US)

(73) Assignee: THE BOEING COMPANY, Chicago, IL (US)

( * ) Notice: Subject to any disclaimer, the term of this patent is extended or adjusted under 35 U.S.C. 154(b) by 545 days.

(21) Appl. No.: 13/626,144

(22) Filed: Sep. 25, 2012

(65) Prior Publication Data

US 2014/0085459 A1   Mar. 27, 2014

(51) Int. Cl.
*H04N 7/18* (2006.01)
*G09G 3/00* (2006.01)
*H04N 17/04* (2006.01)

(52) U.S. Cl.
CPC .............. *G09G 3/006* (2013.01); *H04N 17/04* (2013.01); *G09G 2360/145* (2013.01); *G09G 2380/12* (2013.01)

(58) Field of Classification Search
CPC ................................. H04N 7/18; G09G 3/006
USPC ......................................................... 348/135
See application file for complete search history.

(56) References Cited

U.S. PATENT DOCUMENTS

| | | | |
|---|---|---|---|
| 5,521,907 A | * | 5/1996 | Ennis, Jr. ............ H04L 41/5038 370/253 |
| 6,322,216 B1 | * | 11/2001 | Yee ........................ A61B 3/113 351/210 |
| 6,556,540 B1 | * | 4/2003 | Mawhinney .............. H04L 1/20 370/229 |
| 6,697,097 B1 | | 2/2004 | Parker et al. |
| 7,680,545 B2 | | 3/2010 | Gebert |
| 7,693,082 B2 | | 4/2010 | Wright |

(Continued)

FOREIGN PATENT DOCUMENTS

| | | |
|---|---|---|
| JP | 2005 184749 | 7/2005 |
| JP | 2005-5184749 | * 7/2005 |
| JP | 2009 171334 | 7/2009 |

OTHER PUBLICATIONS

Extended European Search Report in EP Application No. 13177299.8 dated Dec. 17, 2013.

*Primary Examiner* — Jay Au Patel
*Assistant Examiner* — Irfan Habib
(74) *Attorney, Agent, or Firm* — Patterson + Sheridan, LLP

(57) ABSTRACT

A latency measurement system includes an event generation device that generates an initial event used to measure system latency. A component test system receives the event and in response outputs a test component output signal and a zero-latency indicator. An electronics system including a multifunction display unit receives the test component output signal and displays a visible element on the multifunction display unit. A camera generates a series of recorded images, where each recorded image contains an image of the zero-latency indicator and an image of the visible element. A processor then determines the system latency by determining a time difference in the series of recorded images between a representation of an occurrence of the event in the image of the zero-latency indicator and a representation of the occurrence of the event in the image of the visible element.

19 Claims, 9 Drawing Sheets

(56) References Cited

U.S. PATENT DOCUMENTS

| | | | | |
|---|---|---|---|---|
| 7,823,001 B2* | 10/2010 | Clavequin | G06F 1/12 | 327/158 |
| 7,908,507 B2 | 3/2011 | Ogura | | |
| 8,290,526 B2* | 10/2012 | Broadley | H04W 84/08 | 455/3.05 |
| 8,334,716 B1* | 12/2012 | Davidson | H03L 7/085 | 327/234 |
| 8,743,020 B1* | 6/2014 | Mazuk | G06F 15/00 | 345/1.1 |
| 8,838,322 B1* | 9/2014 | Zhu | G01S 17/023 | 342/71 |
| 8,838,863 B2* | 9/2014 | Henriksson | G06F 13/1615 | 710/240 |
| 8,898,687 B2* | 11/2014 | Hulten | H04N 21/442 | 725/12 |
| 8,911,087 B2* | 12/2014 | Publicover | A61B 3/113 | 351/200 |
| 2003/0021241 A1* | 1/2003 | Dame | H04B 7/18506 | 370/321 |
| 2003/0133031 A1* | 7/2003 | Moberg | H04N 3/1568 | 348/312 |
| 2005/0275831 A1* | 12/2005 | Silver | G06K 9/4609 | 356/237.1 |
| 2007/0081094 A1* | 4/2007 | Ciudad | H04N 5/2354 | 348/371 |
| 2007/0183493 A1* | 8/2007 | Kimpe | G06F 21/6245 | 375/240.1 |
| 2008/0307307 A1* | 12/2008 | Ciudad | G06T 13/80 | 715/719 |
| 2008/0310676 A1* | 12/2008 | Silver | G06T 7/0044 | 382/103 |
| 2009/0279611 A1* | 11/2009 | Gao | H04N 19/176 | 375/240.24 |
| 2009/0310672 A1* | 12/2009 | Rao | H04N 7/148 | 375/240.03 |
| 2010/0002893 A1* | 1/2010 | Theverapperuma | H04R 1/1083 | 381/82 |
| 2010/0141762 A1* | 6/2010 | Siann | H04N 7/185 | 348/143 |
| 2010/0166065 A1* | 7/2010 | Perlman | A63F 13/12 | 375/240.07 |
| 2010/0167713 A1* | 7/2010 | Hoffman | H04M 3/2227 | 455/418 |
| 2010/0214238 A1* | 8/2010 | Christoph | B60K 35/00 | 345/173 |
| 2011/0107220 A1* | 5/2011 | Perlman | A63F 13/12 | 715/720 |
| 2011/0109644 A1* | 5/2011 | Geutskens | G06F 3/017 | 345/589 |
| 2011/0219112 A1* | 9/2011 | Fagg | H04L 41/083 | 709/224 |
| 2012/0105473 A1* | 5/2012 | Bar-Zeev | G02B 27/017 | 345/633 |
| 2012/0144409 A1* | 6/2012 | Pham | H04H 60/31 | 725/13 |
| 2012/0281767 A1* | 11/2012 | Duenas | H04N 19/176 | 375/240.24 |
| 2012/0287288 A1* | 11/2012 | Steinberg | H04N 17/04 | 348/181 |
| 2012/0287289 A1* | 11/2012 | Steinberg | H04N 17/004 | 348/181 |
| 2013/0182104 A1* | 7/2013 | Mangold | H04N 21/21805 | 348/143 |
| 2013/0188544 A1* | 7/2013 | Tiwari | H04W 52/0222 | 370/311 |
| 2014/0036095 A1* | 2/2014 | Kaehler | G06F 3/0412 | 348/187 |
| 2014/0075030 A1* | 3/2014 | Wang | G06F 9/50 | 709/226 |

\* cited by examiner

MEASURING LATENCY IN A TEST SYSTEM USING CAPTURED IMAGES

TECHNICAL FIELD

The field of the embodiments presented herein is directed toward a latency measurement system using a camera to capture end-to-end latency on operator displays that processes a series of recorded images to extract timing measurements.

BACKGROUND

Many graphical operator display systems have critical timeline/latency requirements in the field of avionics and vehicle system control. However, system latency measurements in response to meeting respective latency requirements are often difficult to verify and frequently involve internal trigger signals that only generally approximate end-to-end latency. Manual timing measurements of latency on an oscilloscope are prone to error and are awkward in obtaining statistical distributions of system latency.

Typically there is no method to measure end-to-end system latency on a variety of systems without perturbing the actual system operation. In addition, when these measurements were possible, they often required significant manual operations that are prone to error. Difficulties in measuring system latencies are caused by the limited ability to take large numbers of sequential timing measurements to form statistical distributions, the automated processing of sequential timing measurement to eliminate manual measurement error, the challenge to provide a non-evasive end-to-end measurement, and the relative inflexibility to measure a variety of avionic and vehicular components within electronics systems. It is with respect to these and other considerations that the disclosure herein is presented.

SUMMARY

It should be appreciated that this Summary is provided to introduce a selection of concepts in a simplified form that are further described below in the Detailed Description. This Summary is not intended to be used to limit the scope of the claimed subject matter.

In one embodiment disclosed herein, a latency measurement system includes an event generation device that generates an initial event used to measure system latency. A component test system receives the event and in response outputs a test component output signal and a zero-latency indicator. An electronics system including a multifunction display unit receives the test component output signal and displays a visible element on the multifunction display unit. A camera generates a series of recorded images, where each recorded image contains an image of the zero-latency indicator and an image of the visible element. A processor then determines the system latency by determining a time difference in the series of recorded images between a representation of an occurrence of the event in the image of the zero-latency indicator and a representation of the occurrence of the event in the image of the visible element.

In another embodiment disclosed herein, a method of measuring latency includes triggering an event that generates an indication of the event at both a test component and a zero-latency indicator at substantially the same time. The indication of the event is sent from the test component to a multi-function display device, and a series of images are recorded with a camera, where each image contains both a representation of the zero-latency indicator and a representation of the multi-function display device. A computing device processes the series of images to compute a latency value of the test component based determining a time difference between the indication of the event by the zero-latency indicator and the multi-function display device.

In another embodiment disclosed herein, a method for measuring latency in electronic equipment includes generating pulsed source signals at a sensor aperture and at a multi-functional display and capturing a source illumination and multi-functional display illumination directly and through a sensor path using a high frame rate camera. A number of regions of interest are isolated for the source illumination and the multi-functional display illumination in video captured by the high frame rate camera. Peak thresholds are detected in the regions of interest and a plurality of binary waveforms are created based on the detected peak thresholds. A number of edges are detected from the binary waveform measuring one of rising or falling, and thereby, a delta time is measured between the source and the multi-functional display edges providing a latency measurement.

The features, functions, and advantages that have been discussed can be achieved independently in various embodiments of the present disclosure or may be combined in yet other embodiments, further details of which can be seen with reference to the following description and drawings.

BRIEF DESCRIPTION OF THE DRAWINGS

The embodiments presented herein will become more fully understood from the detailed description and the accompanying drawings, wherein.

DETAILED DESCRIPTION

The following detailed description is directed to a latency measurement system for determining latency of specific components and systems of components within an electronics system. The latency measurement system provides an end to end measurement capability that does not alter the electronics system. In addition, the ability to record and process graphical images in a video format of operator displays allows for repeatability, removes manual errors, and enables the rapid collection of thousands of measurements that can generate statistical data about system latency that affect specific components and systems of components operating in the context of an electronics system.

Embodiments presented herein consist of equipment and associated signal processing used to measure critical timelines within electronics systems. The latency measurement system is flexible and applies, for example, to component sensor video images, warning indications, and inertial measurement. The system utilizes a non-intrusive measurement by means of a imaging camera that records images of external zero-latency event stimulus (e.g., LED, laser angle, etc.) and the associated system output at an operator display device. Automated image processing algorithms analyze the recorded sequential images to generate individual latency measurement and statistical representations of latency in the system (mean, standard deviation, histograms) based on thousands of automatic measurements from the recorded sequential images.

Imaging cameras, that may include high frame-rate video camera, capture end-to-end latency on operator display devices based on external triggered events picked up by sensors or hardware designed to output information to be displayed on the operator display device. The imaging cameras do not perturb system operations while taking sequential images which are then subsequently processed to determine system latency and statistical representations of system latency over a period of time.

Figure 1:
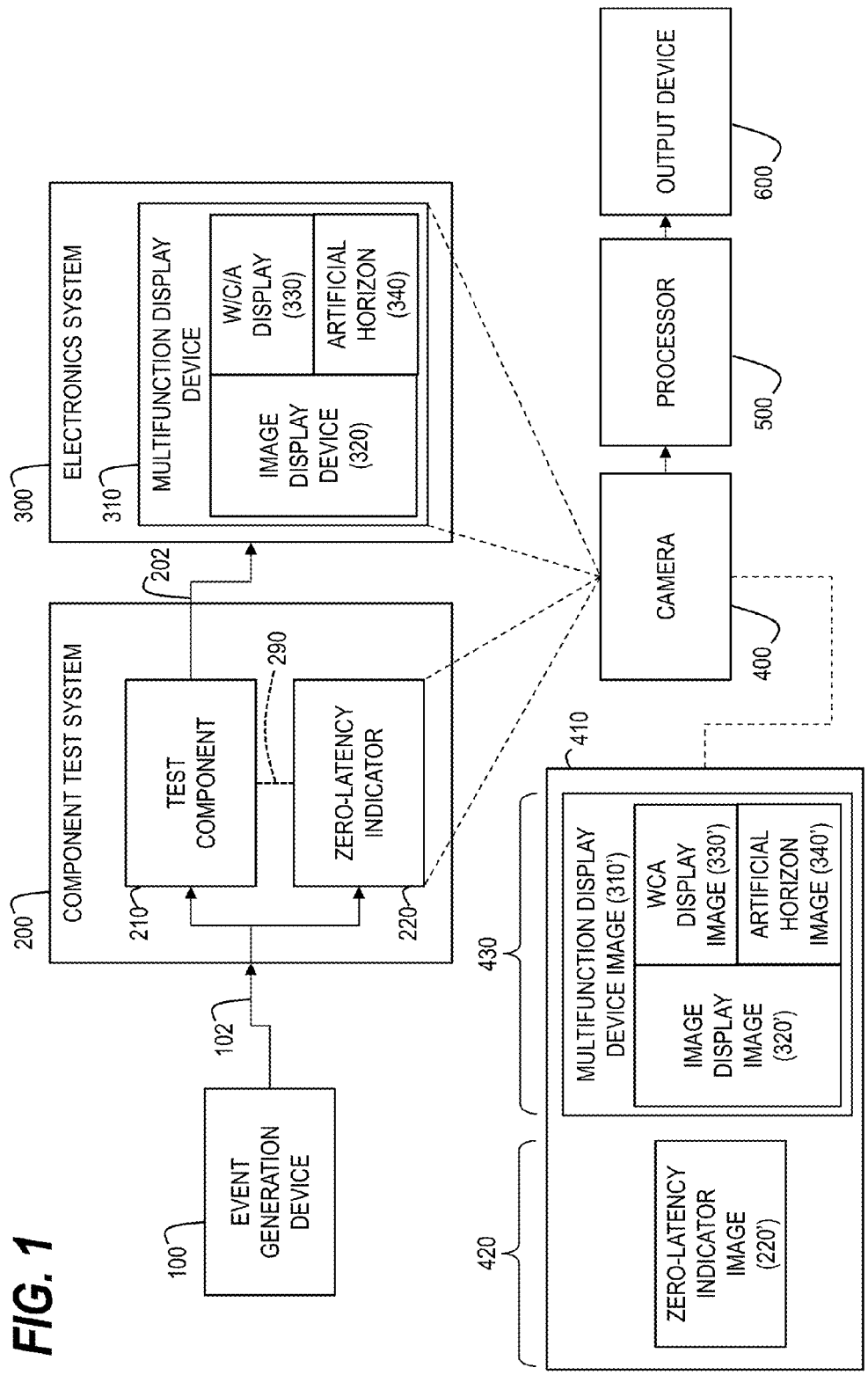
FIG. 1 illustrates a schematic diagram of at least one generic embodiment disclosed herein.

FIG. 1 illustrates a schematic diagram of an embodiment that generally typifies the embodiments described hereafter. An event generation device 100 generates an event 102 that is fed into a component test system 200. The generated event 102 may include an event trigger signal, rotation motion or electromagnetic radiation, where each generated event either produces or simulates a condition that is anticipated to be received by a zero-latency indicator 220 and may be received by a test component 210 and of the component test system 200. The generated event 102 may be transmitted to both the zero-latency indicator 220 and the test component 210 at substantially the same time, or may be transmitted to the zero-latency indicator 220 only wherein the output of the zero-latency indicator 220 may be relationally communicated 290 to the test component 210.

The component test system 200 may generally include at least a combination of the test component 210 that is to be tested for latency and the zero-latency indicator 220, and may further include some relationship 290 between these two elements as will be described hereafter. The zero-latency indicator may include an electromagnetic radiation emitter that may emit a visible or non-visible wave-length when the generated event 102 is received.

The test component 210 of the component test system 200 may transmit a test component output signal 202 to an electronics system 300 that includes a multifunctional display device 310. The multifunctional display device 310 may include at least one of, or a combination of, a graphical image display device 320 that graphically display images based on input received at the electronics system 300, a warning/caution/advisory (WCA) indicator display 330 that is activated based on input received at the electronics system 300, or an artificial horizon display 340 that corresponds to input received at the electronics system 300. Additionally, the graphical image display device 320 may include the functionality of the WCA indicator display 330 and the artificial horizon display 340, or each component may be discretely separate from each other in the multifunction display device 310. The electronics system 300 is capable of generating a visible element in any of these configurations based on receiving the test component output signal 202. Additionally, the electronics system 300 that includes the multifunction display device 310 may be an avionics control system, a land vehicle control system or a ship control system.

A camera 400 generates a series of recorded images where each representative recorded image 410 contains an image 220' of the zero-latency indicator 220 and an image 310' of at least a portion of the multifunction display device 310 containing a visible element displayed thereon triggered by the test component 210. For example, the visible element on the multifunction display device 310 that is recorded may be an image of the image display device 320', a WCA indicator display image 330' and an artificial horizon image 340'. The series of recorded images may be recorded in a digital format as a video recording and may be performed at a high frame rate to detect small measurements of latency between images received and recorded in the camera 400.

A processor 500 receives the series of images from the camera 400 and analyzes each recorded image 410 with respect to successive recorded images. The processor locates in each recorded image a region of interest 420 where the zero-latency indicator image 220' is located, and a region of interest 430 on the multifunction display device image 310' that may include the image display device image 320', the WCA display image 330' and/or the artificial horizon image 340'. The processor may detect a time difference between a representation of an occurrence of an event the region of interest 420 within the zero-latency indicator image 220' and a representation of an occurrence of the event in the region of interest 430 on the multifunction display device image 310'. The detected time difference represents a measurement of latency between the occurrence of the event represented by the zero-latency indicator 220 and the occurrence of the same event transmitted to the test component 210 through the electronics system 300 to an event generated display indication on a particular display portion on the multifunction display device 310.

An output device 600 connected to the processor 500 outputs the determined latency measurement in a print format, a graphical display or any other format capable of communication of component system latency to an operator testing a component for system latency in an electronics system.

Figure 2:
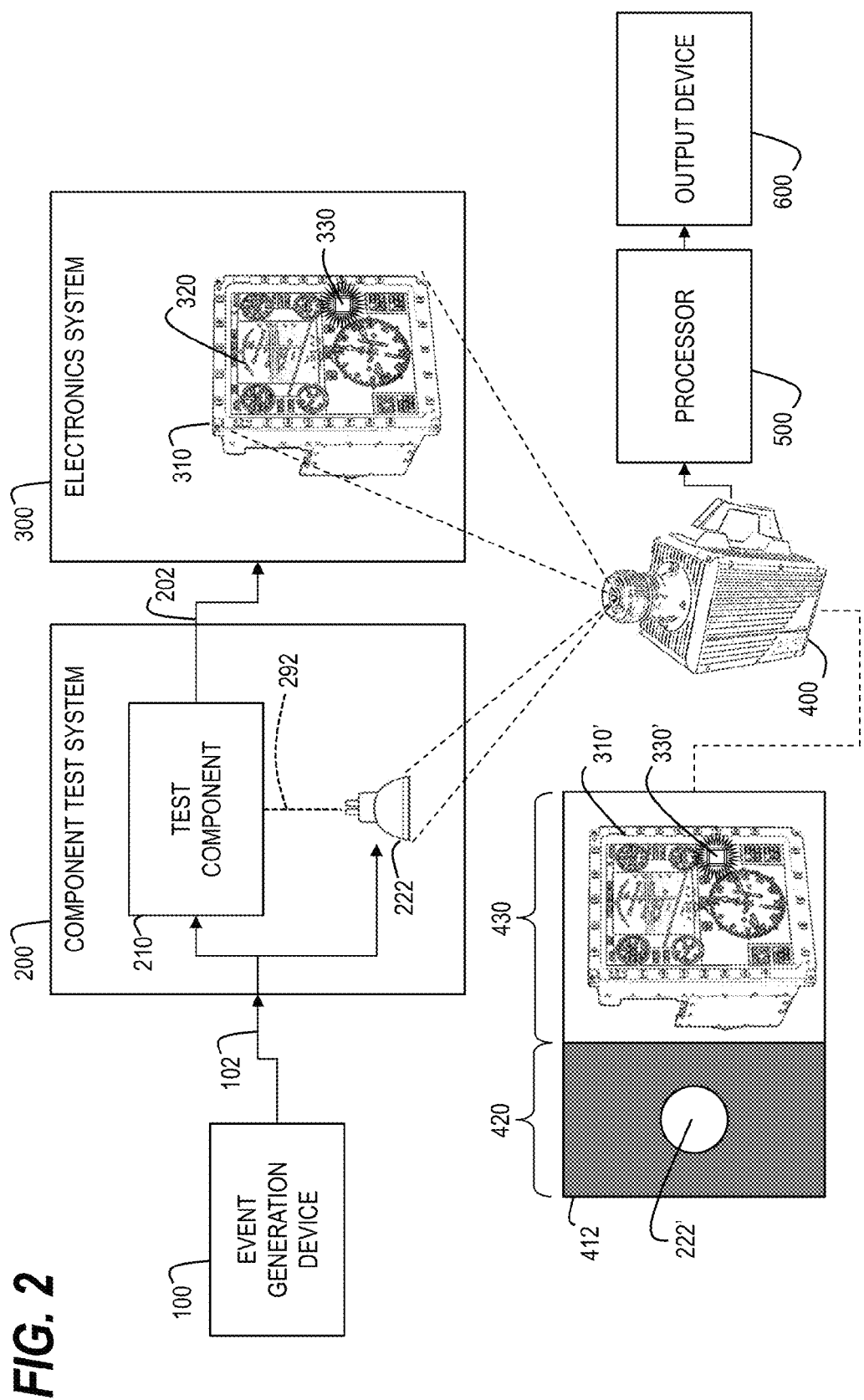
FIG. 2 illustrates a schematic diagram of a second embodiment disclosed herein.

FIG. 2 illustrates a schematic diagram of a second embodiment that determines component latency where an event generation device 100 generates an event 102 that is fed into a component test system 200. (Elements that remain substantially the same within difference embodiments will retain the same reference numbers.) The generated event 102 in this embodiment may include an event trigger signal or electromagnetic radiation, where the generated event either produces or simulates a condition that is anticipated to be received by a zero-latency indicator 222 and may be received by a test component 210 of the component test system 200. The zero-latency indicator 222 may include an electromagnetic radiation emitter that may include an infrared illumination source, a low-level visible light illumination source, a visible light source (e.g., a Light Emitting Diode (LED)), or a laser. The generated event 102 may be transmitted to both the zero-latency electromagnetic radiation emitter indicator 222 and the test component 210 at substantially the same time represented by reference number 292.

In this embodiment, the component test system 200 may include a combination of the test component 210 that is to be tested for latency and the zero-latency electromagnetic radiation emitter indicator 222. The test component 210 of the component test system 200 may transmit a test component output signal 202 to an electronics system 300 that includes a multifunctional display device 310. The multifunctional display device 310 in this embodiment may include a warning/caution/advisory (WCA) indicator display 330 that is activated based on input received at the electronics system that corresponds to input received at the electronics system. The electronics system 300 is capable of generating a visible element at the WCA indicator display 330 based on receiving the test component output signal 202. This visible element may include a discrete warning light or a graphical representation on a graphics display.

A camera 400 generates a series of recorded images where each representative recorded image 412 contains an image 222' of the zero-latency indicator 222 and an image 310' of at least a portion of the multifunction display device 310 containing a visible element 330' displayed thereon triggered by the test component 210. The visible element recorded on the multifunction display device 310 in this embodiment may be an image of the WCA indicator display image 330', or may be an equivalent visible image displayed on the graphical display device 320 of the multifunction display device 310. These series of recorded images may be recorded in a digital format as a video recording and may be performed at a high frame rate to detect small measurements of latency between images received and recorded in the camera 400.

A processor 500 receives the series of images from the camera 400 and analyzes each recorded image 410 with respect to successive recorded images. The processor locates in each recorded image a region of interest 420 where the zero-latency electromagnetic radiation emitter indicator image 222' is located, and a region of interest 430 on the multifunction display device image 310' that includes the WCA display image 330'. The processor may detect a time difference between a representation of an occurrence of an event in the region of interest 420 within the zero-latency electromagnetic radiation emitter indicator image 222' and a representation of an occurrence of the event in the region of interest 430 on the multifunction display device image 310'. The detected time difference represents a measurement of latency between the occurrence of the event represented by the zero-latency electromagnetic radiation emitter indicator 222 and the occurrence of the same event transmitted to the test component 210 through the electronics system 300 to an event generated display indication 330' on a particular display portion on the multifunction display device 310. The output device 600 connected to the processor 500 outputs the determined latency measurement in a print format, a graphical display or any other format capable of communication of component system latency to an operator testing a component for system latency in an electronics system.

Figures 3A, 3B:
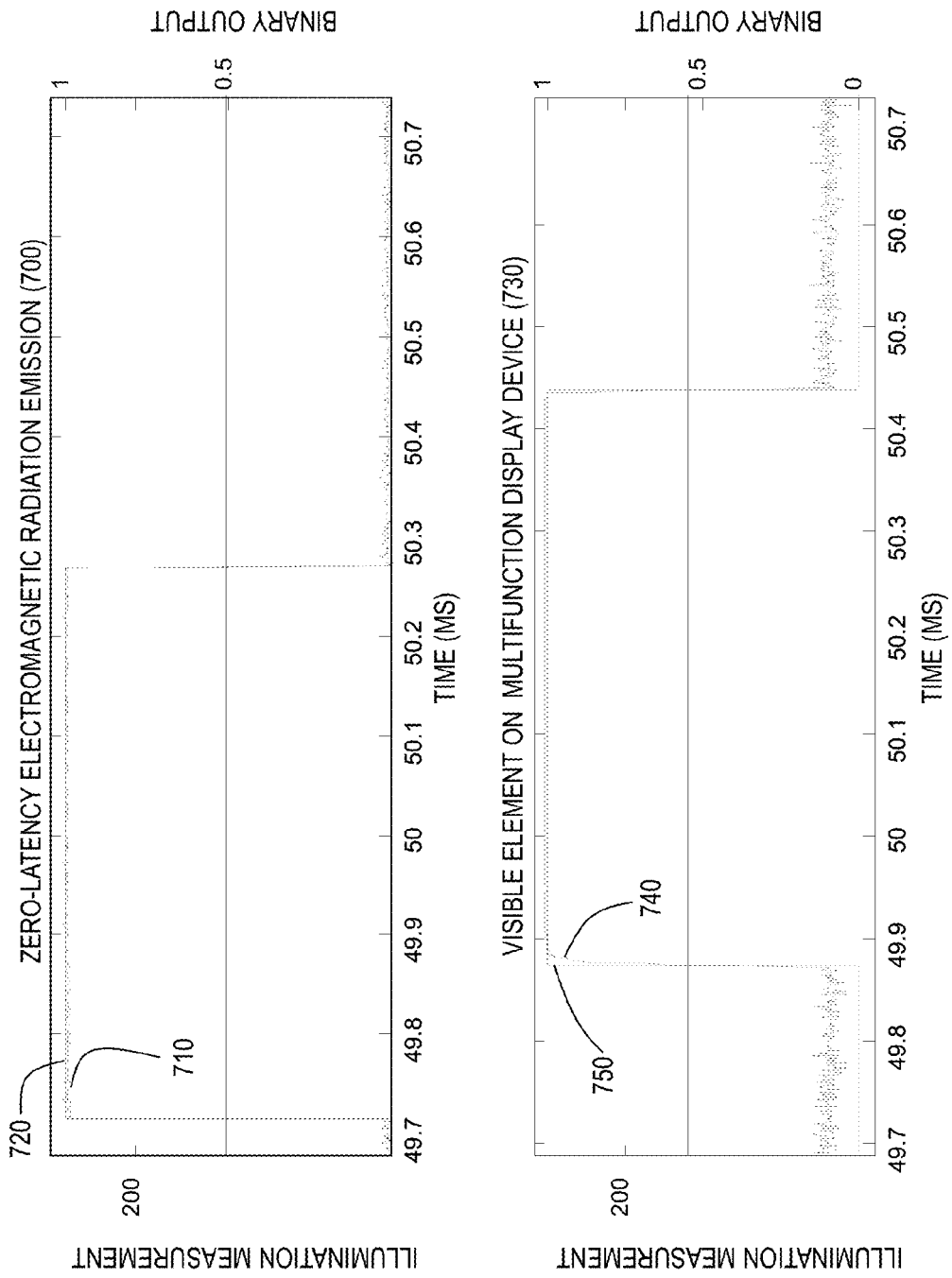
FIG. 3A illustrates a thresholding procedure to create binary waveforms for a region of interest containing a zero-latency indicator in a video frame.
FIG. 3B illustrates a thresholding procedure to create binary waveforms for a region of interest containing a display element of the multifunction display in a video frame.

FIG. 3A illustrates a thresholding procedure to create binary waveforms for a region of interest, e.g., 420, containing a zero-latency indicator in a video frame 412. A zero-latency electromagnetic radiation emission graph 700 illustrates a region of interest signal 710 being generated from the image of the zero-latency indicator, e.g., in FIG. 2, reference number 222'. A binary waveform 720 is generated from the region of interest signal 710 to define at least a leading edge of the zero-latency indicator with respect to a unit of time. Thus, a threshold is detected within the representation of the occurrence of the event in the image of the zero-latency indicator, and a plurality of binary waveforms are created based on detecting the threshold within the representation of the occurrence of the event in the image of the zero-latency indicator.

FIG. 3B illustrates a thresholding procedure to create binary waveforms for a region of interest e.g., 430 containing a display element of the multifunction display in a video frame 412. A visible element on the multifunction display device graph 730 illustrates a region of interest signal 740 being generated from the image of the multifunction display device, e.g., in FIG. 2, reference number 330'. A binary waveform 750 is generated from the region of interest signal 740 to define at least a leading edge of the visible element on the multifunction display device with respect to a unit of time. Thus, a threshold is detected within the representation of the occurrence of the event in the image of the visible element, and a plurality of binary waveforms are created based on detecting the threshold within the representation of the occurrence of the event in the image of the visible element.

Figure 4:
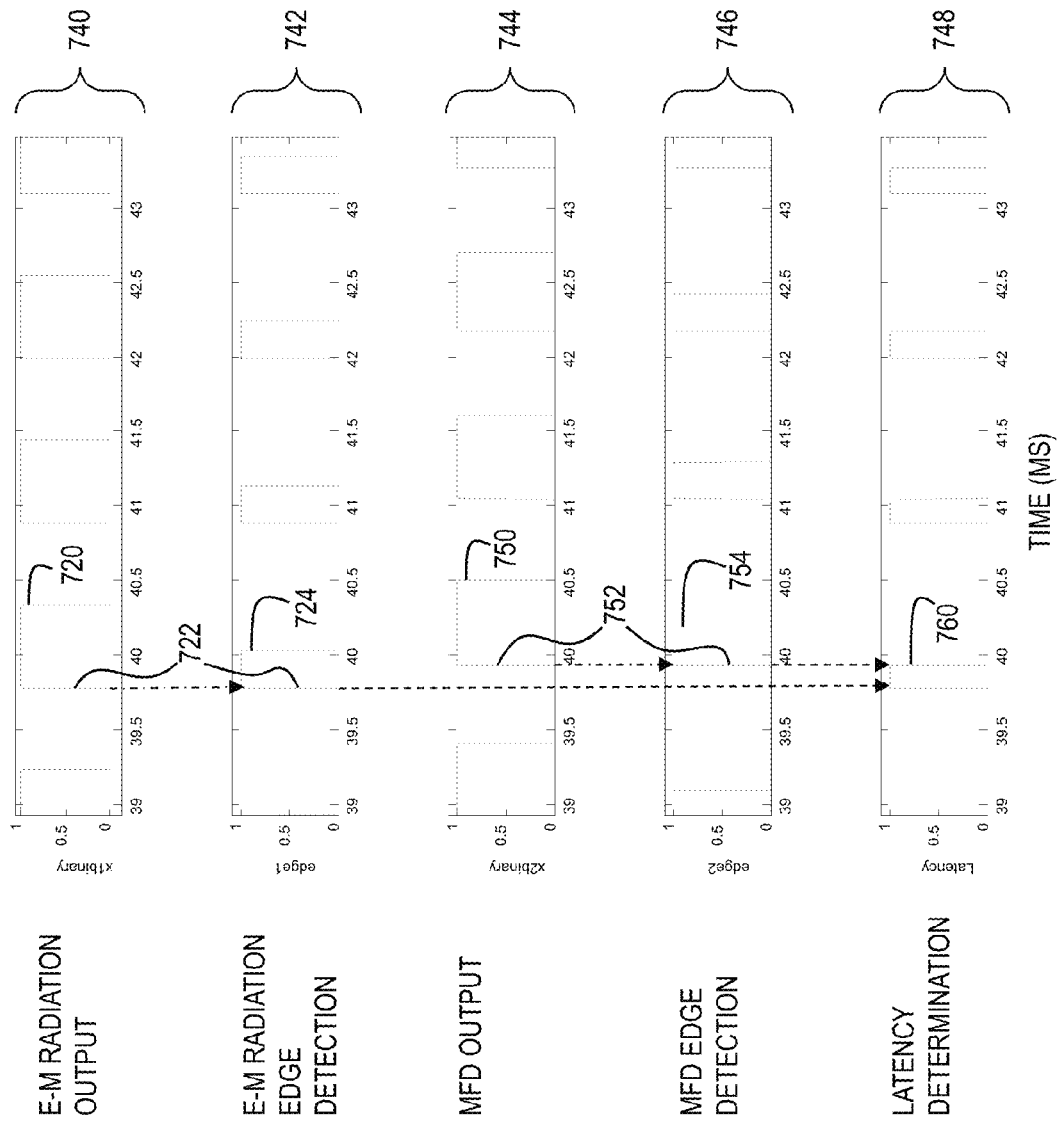
FIG. 4 illustrates a processing of binary waveforms created in FIG. 3 to detect edges and thereby determine a latency measurement.

FIG. 4 illustrates a processing of binary waveforms created in FIG. 3 to detect edges and thereby determine a latency measurement. Graph 740 illustrates a binary waveform 720 of electromagnetic radiation output of, e.g., the zero-latency indicator 222. Graph 742 illustrates the detection of edges 724 for each of the plurality of binary waveforms that measure one of rising or falling, where a leading edge 722 is a rising edge. Graph 744 illustrates a binary waveform 750 of a visible element 330' of a multifunction display device, e.g., of the WCA indicator 330. Graph 746 illustrates the detection of edges 754 for each of the plurality of binary waveforms that measure one of rising or falling, where a leading edge 752 is a rising edge. Graph 748 illustrates measuring a delta time 760 between the leading edge of the zero-latency indicator 722 and the leading edge of the image of the visible element in the multi-function display device 752 based on the detected edges for each of the plurality of binary waveforms. Automated image processing algorithms may then further analyze the recorded sequential images and their corresponding extracted edges to generate individual latency measurements and statistical representations of latency measurements in the system (e.g., mean, standard deviation, histograms) based on thousands of automatic measurements from the recorded sequential images.

Figure 5:
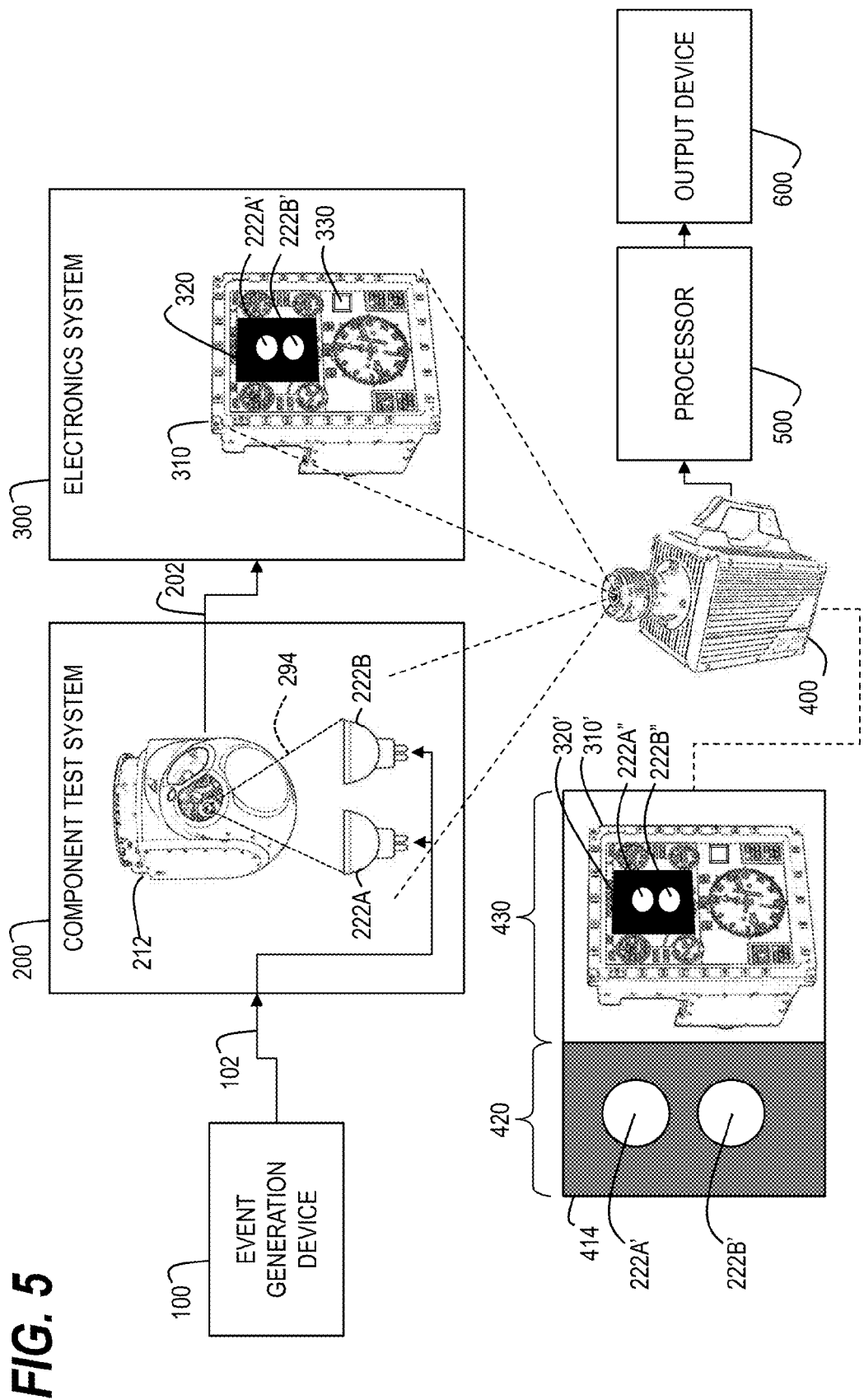
FIG. 5 illustrates a schematic diagram of a third embodiment disclosed herein.

FIG. 5 illustrates a schematic diagram of a third embodiment that determines video signal latency where an event generation device 100 generates an event 102 that is fed into a component test system 200. The generated event 102 may include an event trigger signal or electromagnetic radiation, where each generated event either produces or simulates a condition that is received by zero-latency indicators 222A and 222B. The zero-latency indicators 222A and 222B may include an infrared illumination source, a low-level visible light illumination source, a visible light source or a laser output. When the zero-latency indicators 222A and 222B receive a trigger signal event 102 from the event generation device 100, they may emit electromagnetic radiation depending on the nature of the type of emitter. In a representative example, indicator 222A may include an infrared illumination source that outputs an infrared emission and indicator 222B may include a visible light source that outputs a visible light emission. Both of the indicators 222A and 222B receive the trigger signal event 102 at substantially the same time and emit their respective radiation. The emitted radiation from the zero-latency indicators 222A and 222B is communicated 294 to a component that may include an Electro-Optical/Infrared (EO/IR) imaging sensor 212 capable of receiving a plurality of electromagnetic radiation wavelengths, for example in this case, the visible light and infrared wavelengths.

The EO/IR imaging sensor 212 of the component test system 200 may transmit an output signal 202 to an electronics system 300 that includes a multifunctional display device 310. The multifunctional display device 310 may include a graphical image display device 320 that graphically display images based input received at the electronics system from the EO/IR imaging sensor 212. In this embodiment, the graphical image display device 320 produces a visible image of either one or both the zero-latency indicators 222A and 222B triggered by the event signal 102.

A camera 400 generates a series of recorded images where each representative recorded image 414 contains an image or images 222A'and/or 222B' one or both of the zero-latency indicators 222A and 222B, and an image 310' of at least a portion of the multifunction display device 310 containing a visible element 222A" and/or 222B" displayed thereon based on the output by the test EO/IR component 212. Alternatively described, the recorded images as represented by recorded image 414 contain, in a first region of interest 420, first generation image(s) 222A' and/or 222B' of the zero-latency indicators 222A/222B, and in second region of interest 430, second generation image(s) 222A" and/or 222B" of the zero-latency indicators 222A/222B as graphically depicted on the graphical image display device 320 of the multifunction display device 310.

A processor 500 receives the series of images from the camera 400 and analyzes each recorded image 410 with respect to successive recorded images. The processor locates in each recorded image a region of interest 420 where the zero-latency indicator image(s) 222A' and/or 222B' is located, and a region of interest 430 on the multifunction display device image 310' that may include the image display device image 320' graphically representing the second generation images of the zero-latency indicator image(s) 222A" and/or 222B". The processor may detect a time difference between a representation of an occurrence of an event the region of interest 420 within the zero-latency indicator image(s) 222A' and/or 222B' and a representation of an occurrence of the event(s) 222A" and/or 222B" in the region of interest 430 on the multifunction display device image 310'. The detected time difference represents a measurement of latency between the occurrence of the event represented by the zero-latency indicator(s) 222A and/or 222B and the optically sensed occurrence of the same event transmitted by the test EO/IR component 210 to the electronics system 300 to an event generated display indication 222A' and/or 222B' on a the graphical image display of the multifunction display device 310. An output device 600 connected to the processor 500 outputs the determined latency measurement in a print format, a graphical display or any other format capable of communication of component system latency to an operator testing a component for system latency in an electronics system.

Figure 6:
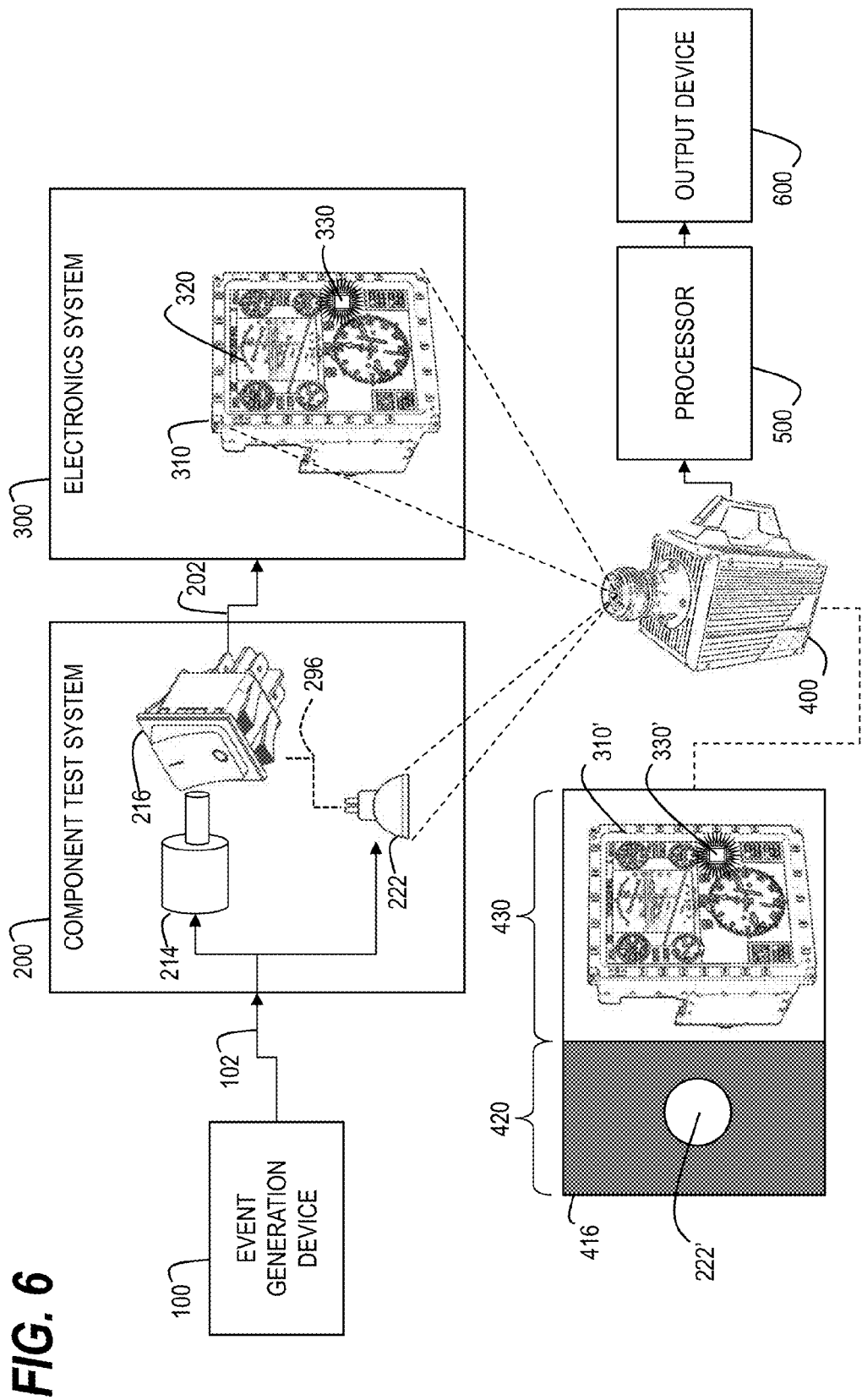
FIG. 6 illustrates a schematic diagram of a fourth embodiment disclosed herein.

FIG. 6 illustrates a schematic diagram of a fourth embodiment that determines hardware latency where an event generation device 100 generates an event 102 that is fed into a component test system 200. The generated event 102 may include an event trigger signal or electromagnetic radiation, where each generated event either produces or simulates a condition that is anticipated to be received by a zero-latency electromagnetic radiation emission indicator 222, (similar to that of FIGS. 2 and 5), and may be received by a test component actuator 214 and switch 216 of the component test system 200. The generated event 102 may be transmitted to both the zero-latency electromagnetic radiation emission indicator 222 and the test component actuator 214 and switch 216 at substantially the same time 296.

The test component switch 216 of the component test system 200 may transmit a test component output signal 202 to an electronics system 300 that includes a multifunctional display device 310. The multifunctional display device 310 in this embodiment may include a graphical image display device 320 that graphically display images based input received at the electronics system, and/or a warning/caution/advisory (WCA) indicator display 330 that is activated based input received at the electronics system. The electronics system is capable of generating a visible element with either of these configurations based on receiving the test component output signal 202.

A camera 400 generates a series of recorded images where each representative recorded image 416 contains an image 222' of the zero-latency indicator 222 and an image 310' of at least a portion of the multifunction display device 310 containing a visible element 330' displayed thereon triggered by the test component 210. The visible element recorded on the multifunction display device 310 in this embodiment may be an image of the WCA indicator display image 330' or may be an equivalent visible image displayed on the graphical display device 320 of the multifunction display device 310. These series of recorded images may be recorded in a digital format as a video recording and may be performed at a high frame rate to detect small measurements of latency between images received and recorded in the camera 400.

A processor 500 receives the series of images from the camera 400 and analyzes each recorded image 410 with respect to successive recorded images. The processor locates in each recorded image a region of interest 420 where the zero-latency electromagnetic radiation emitter indicator image 222' is located, and a region of interest 430 on the multifunction display device image 310' that includes, for example, the WCA display image 330'. The processor may detect a time difference between a representation of an occurrence of an event the region of interest 420 within the zero-latency electromagnetic radiation emitter indicator image 222' and a representation of an occurrence of the event in the region of interest 430 on the multifunction display device image 310'. The detected time difference represents a measurement of latency between the occurrence of the event represented by the zero-latency electromagnetic radiation emitter indicator 222 and the occurrence of the same event transmitted to the test component actuator 214 and switch 216 through the electronics system 300 to an event generated display indication 330' on a particular display portion on the multifunction display device 310. The output device 600 connected to the processor 500 outputs the determined latency measurement in a print format, a graphical display or any other format capable of communication of component system latency to an operator testing a component for system latency in an electronics system.

Figure 7:
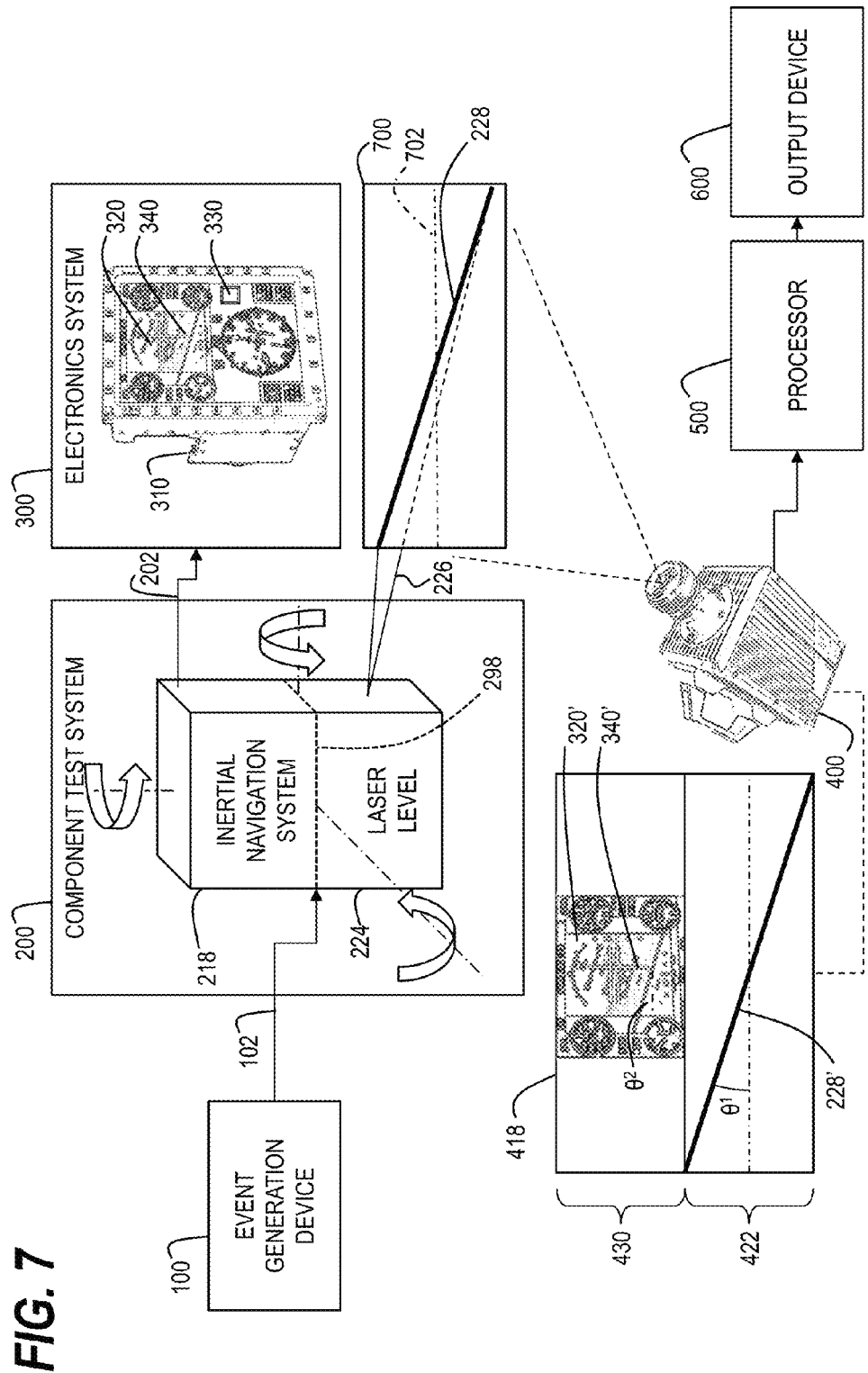
FIG. 7 illustrates a schematic diagram of a fifth embodiment disclosed herein.

FIG. 7 illustrates a schematic diagram of a fifth embodiment that determines internal navigation system latency where an event generation device 100 generates an event 102 that is fed into a component test system 200. The generated event 102 in this embodiment may include rotation motion, (in any of three axes), that either produces or simulates a condition anticipated to be received by a zero-latency laser level indicator 224 directly connected/attached 298 to an inertial navigation system (INS) 218 of the component test system 200. The rotational motion generated event 102 is transmitted to both the zero-latency laser level indicator 224 and the INS 218 at the substantially the same time by nature of both unit being secured to each other. An alternative configuration may include an INS 218 and a zero-latency laser level indicator 224 being separated from each other but being subject to the exact same rotational motion event 102.

The INS 218 of the component test system 200 may transmit a test component output signal 202 to an electronics system 300 that includes a multifunctional display device 310. The multifunctional display device 310 may include a graphical image display device 320 that graphically display images based input received at the electronics system, and/or an artificial horizon display 340 that corresponds to input received at the electronics system 300. Additionally, the graphical image display device 320 may include the functionality of the artificial horizon display 340, or each component may be discretely separate from each other in the multifunction display device 310. The electronics system 300 is capable of generating a visible element, i.e., an artificial horizon, in any of these configurations based on receiving the INS 218 output signal 202.

The zero-latency laser level indicator 224 projects through its aperture a linear laser projection 226 representing a horizontal horizon line relative to the INS 218. A laser line 228 from the projection 226 is imaged onto a surface 700 that bears a visible horizontal reference line 702 such that an angle of rotation of the laser line 228 may be calculated from any discrepancy between the visible horizon reference line 702 and the projected laser line 228.

A camera 400 generates a series of recorded images where each representative recorded image 418 contains a region of interest 422 that contains an image of the zero-latency projected laser line 228' and a region of interest 430 that contains an image of the graphic display device 320' of the multifunction display device 310 containing an artificial horizon element 340' generated by the INS 218. The recorded image of the artificial horizon 340' on the multifunction display device 310 may be an image from the image display device 320' or may be an image from a dedicated artificial horizon device 340.

A processor 500 receives the series of images from the camera 400 and analyzes each recorded image 410 with respect to successive recorded images. The processor locates in each recorded image a region of interest 422 where the zero-latency projected laser line indicator image 228' is located, and a region of interest 430 on the multifunction display device image 310' that may include the image display device image 320' and/or the artificial horizon image 340'. The processor then determines an angle $\theta^1$ of the zero-latency projected laser line indicator image 228' with respect to a horizontal reference line 702, and an angle $\theta^2$ the artificial horizon with respect to a horizontal reference line overlaid on the graphic display device 320 or the artificial horizon display 340. The processor then determines difference in a rate of angular change between the representation of $\theta^1$ of the zero-latency indicator and a rate of angular change of the representation of $\theta^2$ of the artificial horizon based on the output from the INS 218.

Figure 8:
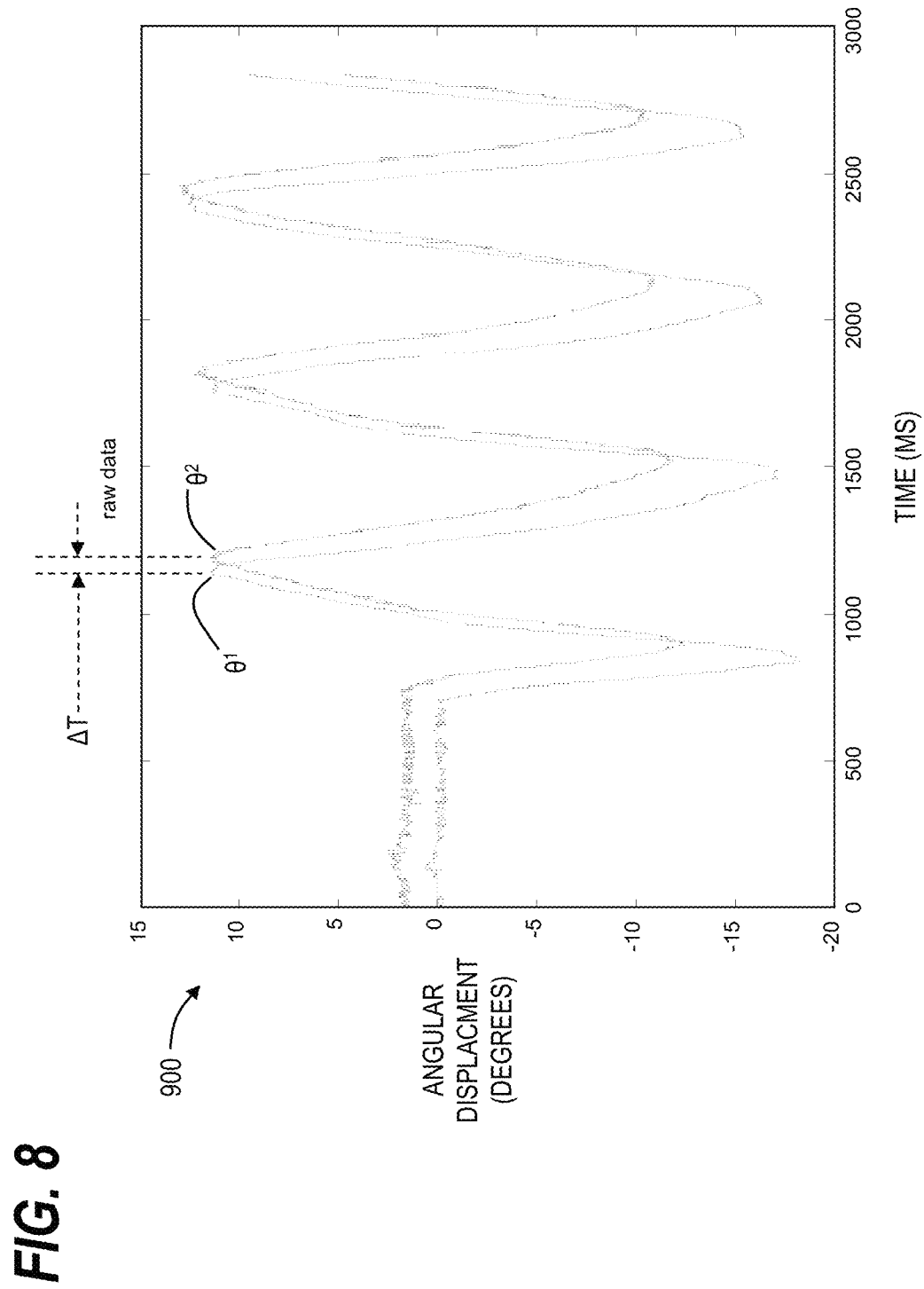
FIG. 8 illustrates a graph of a rate of angular change over time related to the embodiment illustrated in FIG. 7.

FIG. 8 illustrates a graph 900 of a rate of angular change of the zero-latency projected laser line image 228' and the artificial horizon image 340' over time related to the embodiment illustrated in FIG. 7. The processor 500 may detect a time difference, $\Delta T$, between an angular displacement for $\theta^1$ and an angular displacement for $\theta^2$. The detected time difference represents a measurement of latency between the occurrence of the event of rotational motion represented by the projection 228 of the zero-latency laser level indicator 224, and the artificial horizon 340 visible output transmitted from the INS 218 through the electronics system 300 to the multifunction display device 310. An output device 600 connected to the processor 500 outputs the determined latency measurement in a print format, a graphical display or any other format capable of communication of component system latency to an operator testing a component for system latency in an electronics system.

Figure 9:
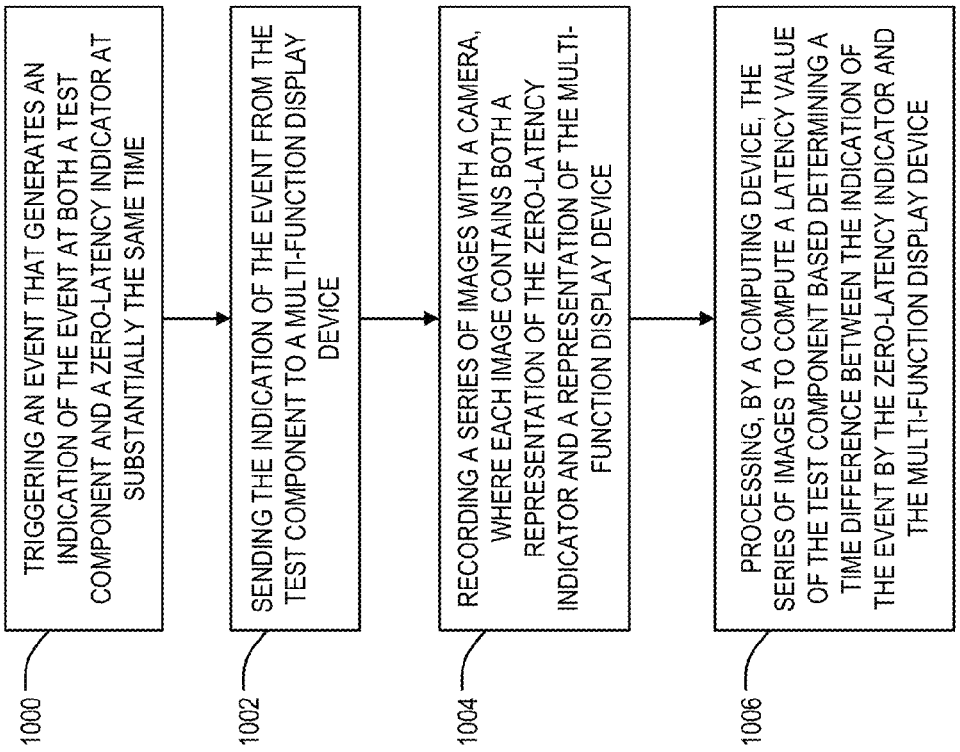
FIG. 9 illustrates a logic flowchart of a method of determining a latency.

FIG. 9 illustrates a logic flowchart of a method of determining latency by triggering 1000 an event that generates an indication of the event at both a test component and a zero-latency indicator at substantially the same time. An indication of the event is sent 1002 from the test component to a multi-function display device. A series of images are recorded 1004 with a camera, where each image contains both a representation of the zero-latency indicator and a representation of the multi-function display device. The series of images are processed 1006 by a computing device to compute a latency value of the test component based determining a time difference between the indication of the event by the zero-latency indicator and the multi-function display device.

The triggering of the event may include one of generating an event trigger signal, generating rotational motion, or transmitting electromagnetic radiation. The method may further include emitting an electromagnetic radiation emission from the zero-latency indicator based on receiving the indication of the event at the zero-latency indicator. The emitting of the electromagnetic radiation emission may further include at least one of emitting an infrared illumination source, emitting a low-level visible light illumination source, emitting a visible light source, or emitting a laser output of a laser level.

Sending the indication of the event may further include sending the indication through an electronics system to the multi-function display device, and upon receipt at the multi-function display device, displaying a visible element on the multi-function display device based on receiving the indication of the event. The visible element displayed on the multi-function display device may include one of displaying the visible element on a graphical image display device that graphically outputs display images based input received at the electronics system, displaying the visible element on a warning/caution/advisory (WCA) indicator that is activated based input received at the electronics system, and/or displaying the visible element on an artificial horizon display that corresponds to input received at the electronics system.

The processing the series of images may further include detecting a threshold within the representation of the zero-latency indicator and a threshold within the representation a visible element displayed on the multi-function display device. A plurality of binary waveforms may be created based on detecting the threshold within the representation of the zero-latency indicator and a threshold within the representation of the visible element displayed on the multi-function display device. Edges are detected for each of the plurality of binary waveforms that measure one of rising and falling. A delta time is measured between the zero-latency indicator and the representation of the visible element on the multi-function display device based on the detected edges for each of the plurality of binary waveforms.

In one embodiment, the method of measuring latency in determining a time difference includes determining the difference in a rate of angular change between the indication of the event by the zero-latency indicator and a rate of angular change of a representation of a visible element on the multi-function display unit.

Another embodiment for a method of measuring latency in electronic equipment includes generating pulsed source signals at a sensor aperture and at a multi-functional display, and capturing a source illumination and multi-functional display illumination directly and through a sensor path using a high frame rate camera. A plurality of regions of interest is isolated for the source illumination and the multi-functional display illumination in video captured by the high frame rate camera. Peak thresholds are detected in the regions of interest and a plurality of binary waveforms are created based on the detected peak thresholds. A plurality of edges of the binary waveform are detected measuring one of rising or falling, and based on the leading edges, a delta time is measured between the source and the multi-functional display edges providing a latency measurement.

The subject matter described above is provided by way of illustration only and should not be construed as limiting. Various modifications and changes may be made to the subject matter described herein without following the example embodiments and applications illustrated and described, and without departing from the true spirit and scope of the present disclosure, which is set forth in the following claims.

The invention claimed is:

1. A latency measurement system, the system comprising:
    an event generation device that generates an event used to measure latency;
    a hardware test component for controlling a vehicle, wherein the test component is configured to receive the event and in response output a test component output signal;
    a zero-latency indicator configured to output a visual indication of the event, wherein the zero-latency indicator and the test component receive the event from the event generation device at substantially the same time;
    an electronics system including a multifunction display device, where the electronics system receives the test component output signal and, in response, displays an image on the multifunction display device;
    a camera that generates a series of recorded images, where each recorded image contains the zero-latency indicator and the image displayed by the multifunction display device; and
    a processor that determines a latency of the test component by determining a time difference in the series of recorded images between a representation of an occurrence of the event as indicated by the zero-latency indicator and a representation of the occurrence of the event as indicated by the image of the multifunction display device.

2. The latency measurement system of claim 1, wherein the event further comprises one of:
    an event trigger signal;
    rotational motion; or
    electromagnetic radiation.

3. The latency measurement system of claim 1, wherein the test component is one of an imaging device, an actuator, or an inertial navigation system and the zero-latency indicator comprises an electromagnetic radiation emitter.

4. The latency measurement system of claim 1, zero-latency indicator comprises an electromagnetic radiation emitter.

5. The latency measurement system of claim 4, wherein the electromagnetic radiation emitter further comprises:
    an infrared illumination source;
    a low-level visible light illumination source;
    a visible light source; or
    a laser output of a laser level.

6. The latency measurement system of claim 1, wherein the electronics system further comprises at least one of:
    an avionics control system;
    a vehicle control system; or
    a ship control system.

7. The latency measurement system of claim 1, wherein the multifunction display device further comprises at least one of:
    a graphical image display device that graphically displays the image based input received at the electronics system;
    a warning/caution/advisory (WCA) indicator display that is activated based input received at the electronics system; or
    an artificial horizon display that corresponds to input received at the electronics system.

8. The latency measurement system of claim 1, where determining the time difference further comprises:
    detecting a threshold within the representation of the occurrence of the event indicated by the zero-latency indicator and a threshold within the representation of the occurrence of the event indicated by the image;
    creating a plurality of binary waveforms based on detecting the threshold within the representation of the occurrence of the event as indicated by the zero-latency indicator and the threshold within the representation of the occurrence of the event as indicated by the image;
    detecting edges for each of the plurality of binary waveforms that measure one of rising or falling; and
    measuring a delta time between the zero-latency indicator and the image in the multifunction display device based on the detected edges for each of the plurality of binary waveforms.

9. The latency measurement system of claim 1, wherein determining the time difference further comprises:
    determining a difference in a rate of angular change between the representation of the occurrence of the event as indicated by the zero-latency indicator and a rate of angular change of the representation of the occurrence of the event as indicated by the image.

10. A method of measuring latency, the method comprising:
    triggering an event that generates an indication of the event at both a hardware test component for controlling a vehicle and a zero-latency indicator at substantially the same time;
    sending the indication of the event from the test component to a multi-function display device which displays an image in response to the indication of the event;
    recording a series of images with a camera, where each image contains both the zero-latency indicator and the image displayed by the multi-function display device; and
    processing, by a computing device, the series of images to compute a latency value of the test component based on determining a time difference between the indication of the event by the zero-latency indicator and the multi-function display device.

11. The method of measuring latency according to claim 10, wherein the triggering an event further comprises one of:
    generating an event trigger signal;
    generating rotational motion; or
    transmitting electromagnetic radiation.

12. The method of measuring latency according to claim 10, further comprising:
    emitting an electromagnetic radiation emission from the zero-latency indicator based on receiving the indication of the event at the zero-latency indicator.

13. The method of measuring latency according to claim 12, wherein the emitting the electromagnetic radiation emission further comprises one of:
- emitting an infrared illumination source;
- emitting a low-level visible light illumination source;
- emitting a visible light source; or
- emitting a laser output of a laser level.

14. The method of measuring latency according to claim 10, wherein the sending the indication of the event further comprises sending the indication through an electronics system to the multi-function display device.

15. The method of measuring latency according to claim 10, wherein the displaying image further comprises one of:
- displaying the image on a graphical image display device that graphically outputs display images based on input received at a the electronics system;
- displaying the image on a warning/caution/advisory (WCA) indicator that is activated based on input received at the electronics system; or
- displaying the image on an artificial horizon display that corresponds to input received at the electronics system.

16. The method of measuring latency according to claim 10, wherein the processing the series of images further comprises:
- detecting a threshold corresponding to the zero-latency indicator and a threshold corresponding to the image displayed on the multi-function display device;
- creating a plurality of binary waveforms based on detecting the threshold corresponding to the zero-latency indicator and a threshold-corresponding to the image displayed on the multi-function display device;
- detecting edges for each of the plurality of binary waveforms that measure one of rising and falling; and
- measuring a delta time between the zero-latency indicator and the image on the multi-function display device based on the detected edges for each of the plurality of binary waveforms.

17. The method of measuring latency according to claim 10, wherein determining the time difference further comprises:
- determining a difference in a rate of angular change between the indication of the event by the zero-latency indicator and a rate of angular change indicated by the image on the multi-function display device.

18. A method for measuring latency in electronic equipment, comprising:
- generating pulsed source signals at a sensor aperture and at a multi-functional display;
- capturing a source illumination and multi-functional display illumination directly and through a sensor path using a high frame rate camera;
- isolating a plurality of regions of interest for the source illumination and the multi-functional display illumination in video captured by the high frame rate camera;
- detecting peak thresholds in the regions of interest;
- creating a plurality of binary waveforms based on the detected peak thresholds;
- detecting a plurality of edges of one of the plurality of binary waveforms by measuring one of rising or falling edges; and
- measuring a delta time between the generated pulsed source signals and the plurality of edges providing a latency measurement.

19. The method of claim 18, further comprising:
- generating the source illumination by emitting an electromagnetic radiation emission based on receiving the generated pulsed source signals; and generating the multi-functional display illumination by receiving an event signal based on the generated pulsed source signals.

* * * * *

UNITED STATES PATENT AND TRADEMARK OFFICE
CERTIFICATE OF CORRECTION

PATENT NO. : 9,514,664 B2  Page 1 of 1
APPLICATION NO. : 13/626144
DATED : December 6, 2016
INVENTOR(S) : William Brendan Blanton et al.

It is certified that error appears in the above-identified patent and that said Letters Patent is hereby corrected as shown below:

In the Claims

Column 13, Line 15, Claim 15, delete "a the" and insert -- a --, therefor.

Signed and Sealed this
Twenty-sixth Day of September, 2017

Joseph Matal
*Performing the Functions and Duties of the*
*Under Secretary of Commerce for Intellectual Property and*
*Director of the United States Patent and Trademark Office*